April 11, 1961  Z. J. LANSKY  2,979,350
SEALS FOR RODS AND SHAFTS
Filed June 29, 1956  4 Sheets-Sheet 1
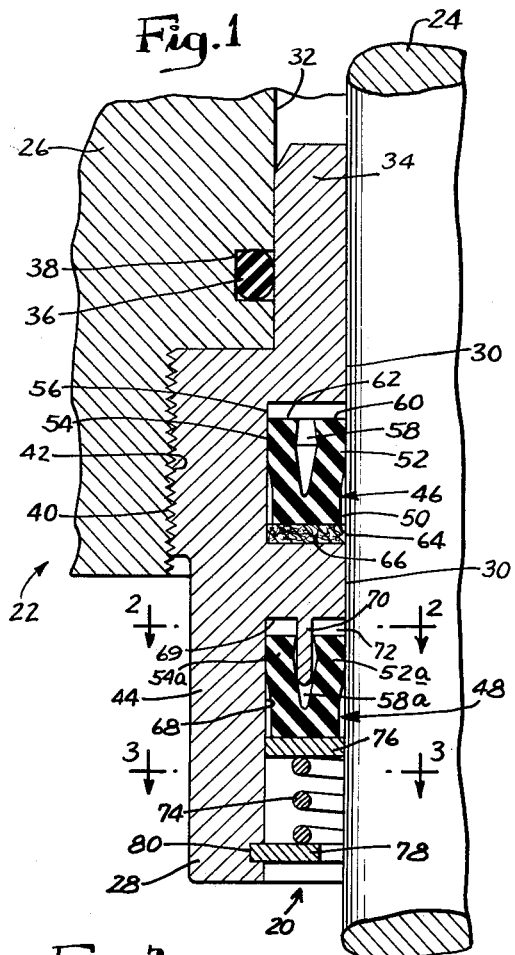
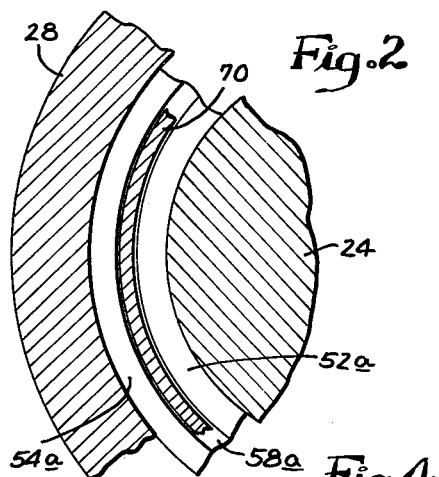
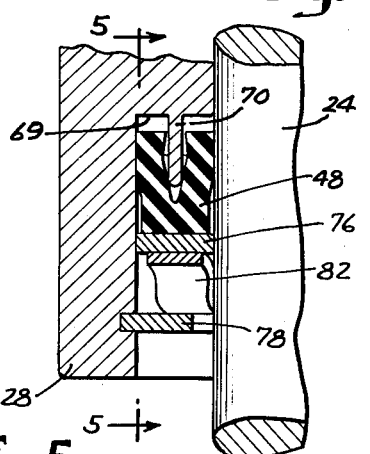
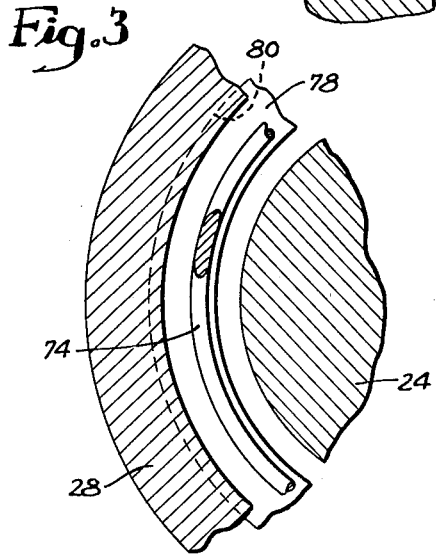
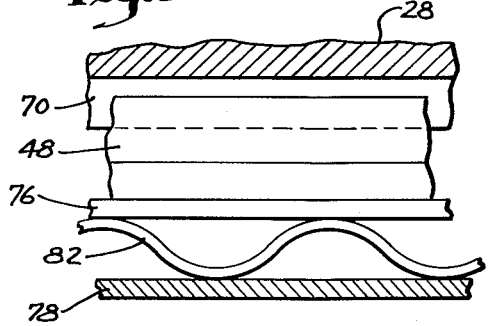
Inventor
ZDENEK J. LANSKY
by: Oomas McDougall, Williams & Hersh
attys.

April 11, 1961
Z. J. LANSKY
2,979,350
SEALS FOR RODS AND SHAFTS
Filed June 29, 1956
4 Sheets-Sheet 2
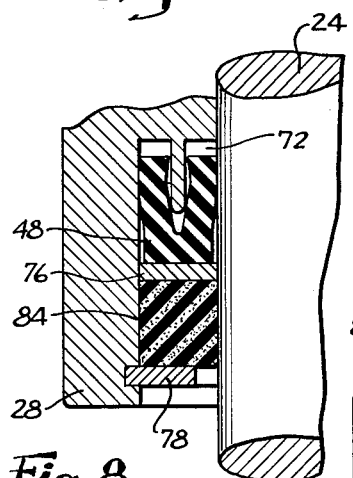
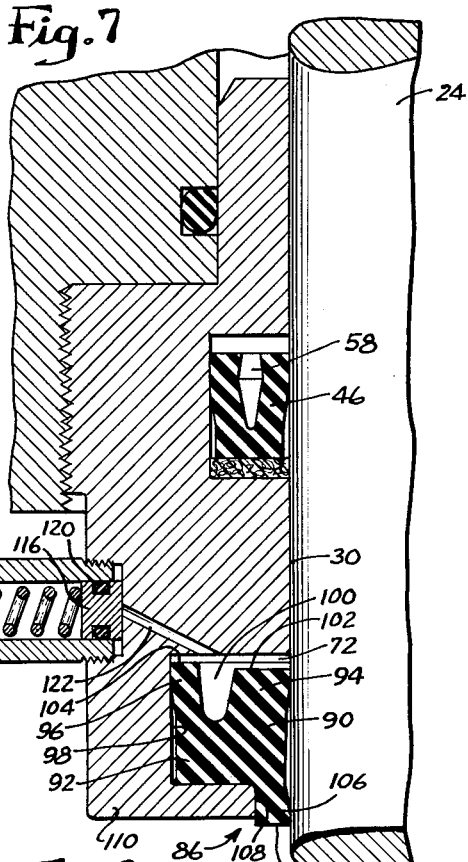
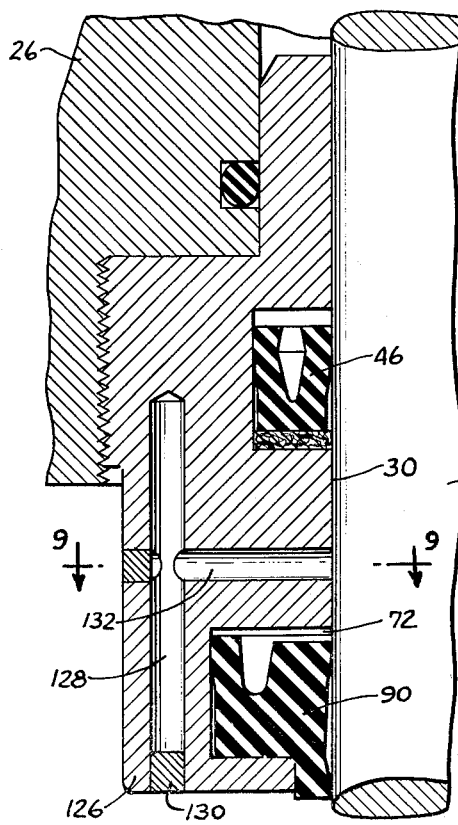
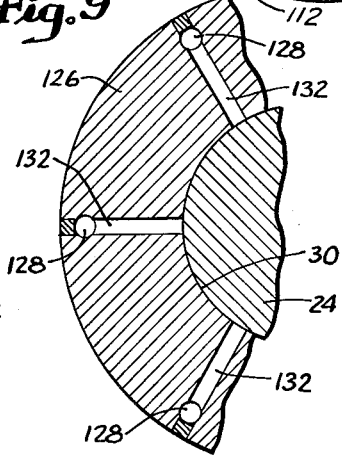
Inventor
ZDENEK J. LANSKY
by: Ooms, McDougall, Williams & Hersh Attys.

April 11, 1961 Z. J. LANSKY 2,979,350
SEALS FOR RODS AND SHAFTS
Filed June 29, 1956 4 Sheets-Sheet 3
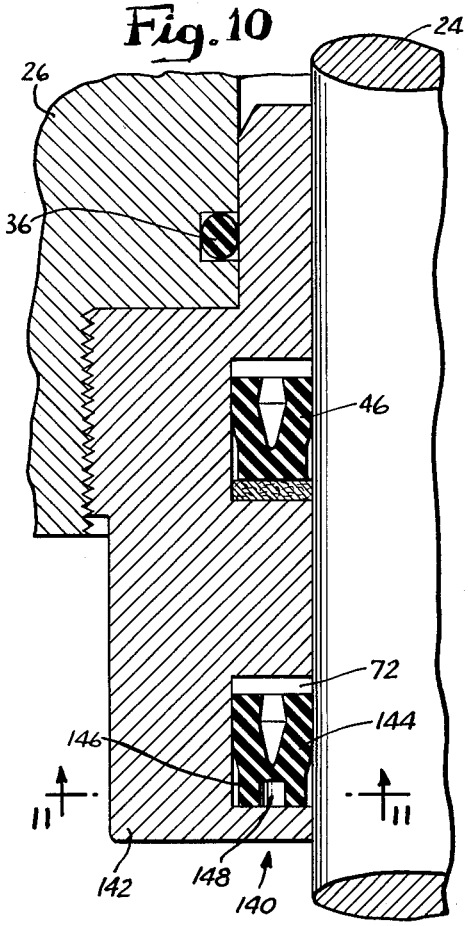
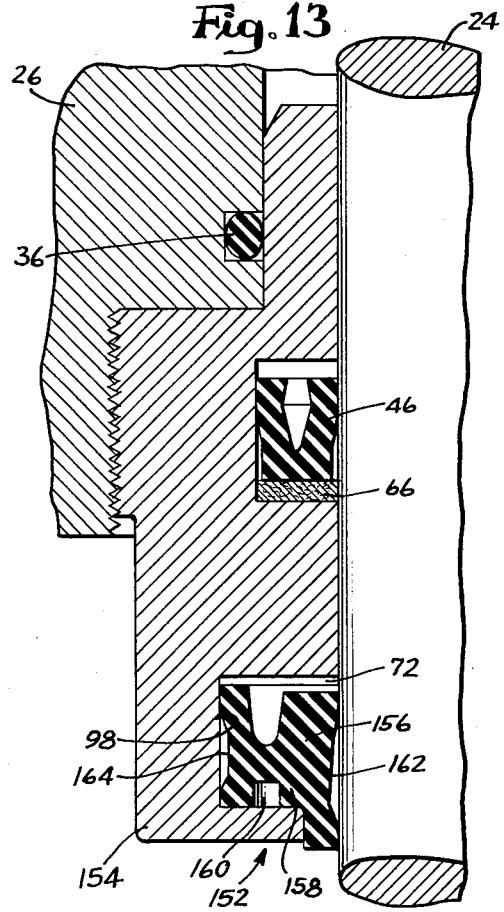
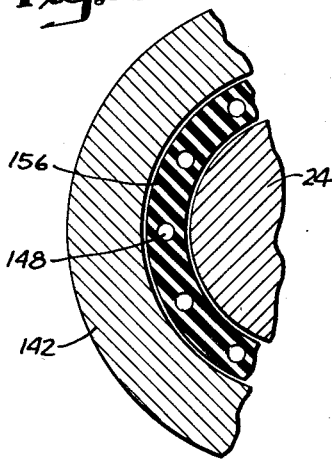
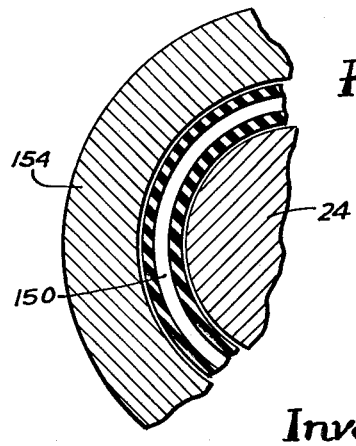
Inventor
ZDENEK J. LANSKY
by: Ooms, McDougall, Williams & Hersh
Attys.

April 11, 1961  Z. J. LANSKY  2,979,350
SEALS FOR RODS AND SHAFTS
Filed June 29, 1956  4 Sheets-Sheet 4
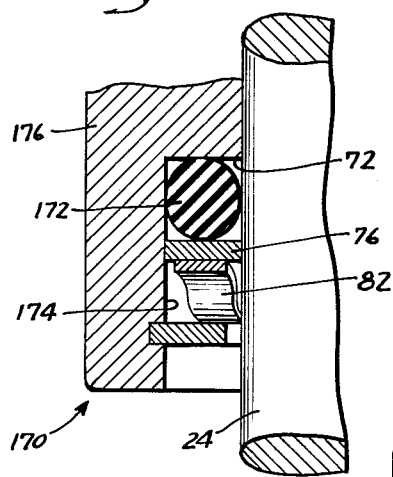
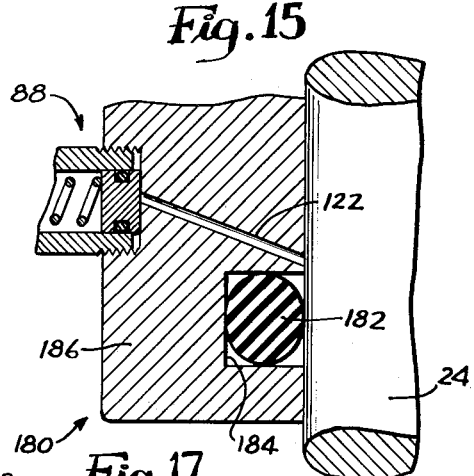
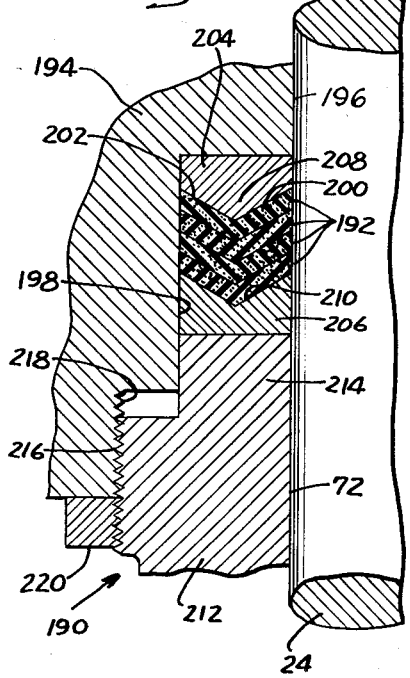
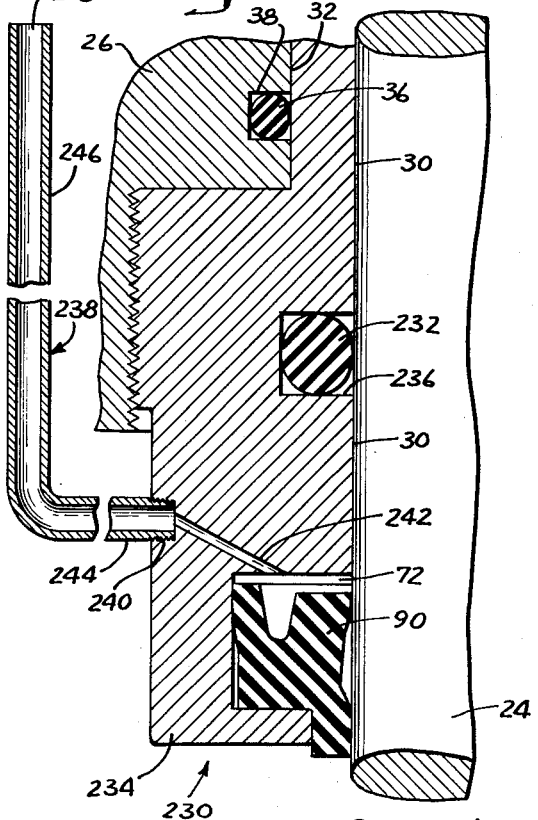
Inventor
ZDENEK J. LANSKY
by: Ooms, MacDougall, Williams & Hersh
Attys.

United States Patent Office 2,979,350
Patented Apr. 11, 1961

2,979,350

SEALS FOR RODS AND SHAFTS

Zdenek J. Lansky, North Riverside, Ill., assignor to Parker-Hannifin Corporation, a corporation of Ohio Filed June 29, 1956, Ser. No. 594,906

19 Claims. (Cl. 286—26)

This invention relates to seals for translatable or rotatable rods and shafts, such as piston rods for hydraulic or other fluid cylinders.

One object of the present invention is to provide new and improved sealing apparatus that will prevent leakage of hydraulic fluid or the like around such a movable rod or shaft and will wipe the rod dry, regardless of the position and direction of the rod.

A further object is to provide such new and improved sealing apparatus that will automatically return all of the fluid wiped from the rod to the interior of the hydraulic cylinder or the like.

Another object is to provide such new and improved sealing apparatus embodying sealing and wiping rings and obviating any tendency for the rings to be blown out of place by fluid pressure.

It is a further object to provide such new and improved sealing apparatus that will be low in cost yet will give long and dependable service.

Further objects and advantages of the present invention will appear from the following description taken with the accompanying drawings, in which:

Fig. 1 is a longitudinal cross sectional view taken through the sealing gland of a hydraulic cylinder or the like, to show an exemplary seal constituting an illustrative embodiment of the present invention.

Figs. 2 and 3 are fragmentary cross sectional views taken generally along lines 2—2 and 3—3 in Fig. 1.

Fig. 4 is a fragmentary view, similar to the lower portion of Fig. 1, but showing a modified seal.

Fig. 5 is a fragmentary enlarged sectional view taken generally along a line 5—5 in Fig. 4.

Fig. 6 is a fragmentary sectional view, also similar to the lower portion of Fig. 1, but showing a third seal of modified construction.

Fig. 7 is a longitudinal sectional view, similar to Fig 1, but showing a fourth seal of modified construction.

Fig. 8 is a longitudinal sectional view, also similar to Fig. 1, but showing a fifth seal of modified construction.

Fig. 9 is a cross sectional view, on a reduced scale, taken generally along a line 9—9 in Fig. 8.

Fig. 10 is a longitudinal sectional view, also similar to Fig. 1, but showing a sixth seal of modified construction.

Fig. 11 is a cross sectional view taken generally along a line 11—11 in Fig. 10.

Fig. 12 is a view similar to Fig. 11 but showing a modified construction.

Fig. 13 is a longitudinal sectional view, also similar to Fig. 1, but showing still another seal of modified construction.

Fig. 14 is a fragmentary longitudinal sectional view illustrating another modified seal, similar to the seal of Fig. 1 but utilizing a modified wiping ring.

Fig. 15 is a fragmentary longitudinal sectional view showing still another modified seal similar to that of Fig. 7, but embodying a modified wiping ring.

Fig. 16 is a fragmentary longitudinal sectional view illustrating another modified seal, similar to that of Fig. 1 but embodying modified sealing rings.

Fig. 17 is a fragmentary longitudinal sectional view illustrating still another seal.

As already indicated, Fig. 1 illustrates a seal 20 as embodied in a hydraulic or other fluid cylinder 22. The illustrated hydraulic cylinder 12 is of the well known type having a piston rod 24 which is translatable longitudinally in telescopic relation to a casing 26. The piston rod 24 is adapted to be actuated by a piston (not shown) which is movable in the casing 26. The general purpose of the seal 20 is to prevent the hydraulic fluid from leaking out of the casing 26 around the piston rod 24.

It will be understood that the seals of the present invention have a wide range of application. Thus, the seals may be applied to various types of fluid actuated devices having relatively translatable, telescopically related members between which a seal is necessary or desirable. Furthermore, the seals may be employed to prevent leakage of fluid between a rotable shaft and its supporting member. However, in some respects, the advantages achieved by the present invention may be utilized most completely when the invention is applied to hydraulic cylinders or the like.

It will be seen that the seal 20, illustrated in Fig. 1, comprises a tubular, annular gland or bushing 28 which serves as a supporting member. Within the gland 28 is an axial bore 30 adapted to provide a bearing for the piston rod 24. In other words, the piston rod 24 is received in the bore 30 with an ordinary, close sliding fit.

The gland 28 is mounted in an axial bore 32 formed in the end wall of the casing 26. More specifically, the gland 28 has a reduced, cylindrical, inner end portion 34 which is received in the bore 32 with a sliding fit therebetween. To prevent leakage of fluid between the gland 28 and the casing 26, a soft, resilient, rubber or rubber-like sealing ring 36 is disposed between the casing 26 and the reduced end portion 34 of the gland. In this instance, the sealing ring 36 is a conventional O-ring received in an annular groove 38 which is formed in the casing 26 along the bore 32.

The gland 28 is threaded into the casing 26 or otherwise suitably retained therein. In this instance, the gland 28 has an enlarged, externally threaded, intermediate portion 40 which is reecived in an enlarged, internally threaded counterbore 42 communicating with the bore 32. The gland 28 also has a portion 44 which extends outwardly, beyond the casing 26, so that the gland may readily be removed therefrom.

In various basic respects, the seal 20 is of the type disclosed and claimed in the copending application of Otto J. Maha, Serial No. 438,381, filed June 22, 1954, and entitled "Sealing Apparatus," now Patent No. 2,907,596, said Maha application and the present application being assigned to a common assignee. Thus, in some respects, the present invention constitutes an improvement over the invention disclosed and claimed in said Maha application and the present application being assigned to a common assignee. Thus, in some respects, the present invention constitutes an improvement over the invention disclosed and claimed in said Maha application.

Thus, the seal 20 of Fig. 1 embodies a sealing ring or primary seal 46 and a wiping ring or secondary seal 48, both of which are made of moderately soft, resilient rubber or rubber-like material. The sealing ring 46 is adapted to prevent any substantial leakage of hydraulic fluid, despite the movement of the piston rod and the presence of hydraulic pressure in the casing 26. However, the combined action of hydraulic pressure and movement of the rod is generally effective to cause the passage of a thin film of hydraulic fluid past the sealing ring 46. This film of fluid adheres to the piston rod 24. The wiping ring 48 is effective to wipe the thin film of hydraulic fluid off the rod 24 so that the exposed portion of the rod, extending beyond the gland 28, will be dry or virtually so. Accordingly, the exposed portion of the rod will not tend to accumulate dust or other foreign matter, which would be the tendency if the rod were wet with a film of hydraulic fluid. Moreover, there is no loss of hydraulic fluid to the space outside the casing, with the result that there is never any dripping of hydraulic fluid from the rod 24 or the gland 28. The fluid wiped off the rod 24 by the wiping ring 28 is automatically returned to the casing 26, past the sealing ring 46.

The illustrated sealing ring 46 is of the specific type disclosed and claimed in the above mentioned Maha application, Serial No. 438,381. Although this type of ring is preferred, it will be understood that any other suitable type of ring or rings may be employed for the purposes of the present invention. This point will be developed in greater detail at a later point in this description. The illustrated ring 46 is generally V-shaped in cross section. Thus, the ring 46 has a generally rectangular base portion 50 with inner and outer lips 52 and 54 extending therefrom. It will be seen that the lips 52 and 54 are generally of flange-like, annular form and are arranged to extend generally in the direction of the bore 30, toward the interior of the casing 26. The lips 52 and 54 diverge from each other and are adapted to be confined beween the piston rod 24 and a generally rectangular groove 56 formed in the gland 28 along the bore 30. An annular groove 58 is defined in the sealing ring 46 between the lips 52 and 54. This groove 58 communicates with the portion of the bore 30 leading into the casing 26. Thus, any hydraulic pressure in the casing 26 is applied between the lips 52 and 54 so as to force them against the piston rod 24 and the bottom wall of the groove 56. In this way, the sealing ring 46 prevents the hydraulic pressure from causing leakage of fluid around the piston rod 24.

In order that the sealing ring 46 may scrape or shear a maximum amount of fluid off the rod 24, the inner lip 52 is formed with a square or radial end face 60, extending at right angles to the surface of the piston rod 24. This feature is disclosed and claimed in the above mentioned Maha application, Serial No. 438,381. The outer lip 54 has a similar square or radial end face 62. The end faces 60 and 62 are square when the sealing ring 46 is in its position of use, with the lips 52 and 54 confined between the rod 24 and the bottom wall of the groove 56. When the ring 46 is in a free state, the lips 52 and 54 flex away from each other, with the result that the end faces 60 and 62 assume angular positions in which they are frusto-conical or tapered in shape. This point is developed at length in the Maha application.

To prevent the inner corner 64 of the sealing ring 46 from being extruded between the piston rod 24 and the bore 32, the outer end or base portion 50 of the sealing ring 46 is backed with a washer or disk 66, which may be made of leather or some other material which is not subject to extrusion.

In this instance, the wiping ring 48 is substantially identical in form to the sealing ring 46. Thus, the wiping ring 48 need not be described in detail. The various portions of the wiping ring 48 have been given the same reference characters as the corresponding portions of the sealing ring 46, with the addition of the suffix "a."

The lips 52a and 54a of the wiping ring 48 are compressed between the piston rod 24 and a recess wall or counterbore 68 which connects with the bore 32 and is spaced outwardly from the groove 56. The bore 68 has an end face 69 with an annular fin 70 thereon to engage the ring 48 between the lips 52a and 54a. The fin 70 acts as a stop to limit axial movement of the ring 48 and prevent the lips 52a and 54a from engaging the end face 69.

It will be understood that the wiping ring 48 may be of various suitable forms, for the purposes of the present invention. Thus, for example, the wiping ring may be of the form illustrated in Fig. 7. This form of the wiping ring will be described at a later point herein, and is disclosed and claimed in the copending Maha application, Serial No. 438,381. Various conventional seals may be used for the wiping ring. Thus, a conventional O ring may be employed, for example.

It will be understood that the gland 28 defines a space 72 between the sealing and wiping rings 46 and 48. This space 72 includes the portion of the bore 32 between the rings 46 and 48. On its inner side, the space 72 is bounded by the outer surface of the piston rod 24.

It has been found that the structure thus far described will operate satisfactorily when the piston rod 24 is directed upwardly. As already indicated, the sealing ring 46 effectively prevents any substantial outward leakage of hydraulic fluid. However, a thin film of fluid adheres to the rod 24 and is carried outwardly past the sealing ring 46. With the rod 24 directed upwardly, this film of fluid is effectively wiped off the rod by the wiping ring 48. The fluid wiped off the rod tends to accumulate in the space 72 between the sealing and wiping rings 46 and 48. When the rod 24 is directed upwardly, the action of gravity carries the fluid downwardly in the space to the lower end thereof, which is adjacent the sealing ring 46 in this case. On the inward strokes of the rod 24, some of the fluid in the space 72 adheres to the rod and is carried inwardly past the sealing ring 46. It has been found that the rod 24 carries at least as much fluid inwardly as it does outwardly, with the result that the accumulation of fluid in the space 72 is small, when the rod is directed upwardly. The action is much the same when the rod is directed horizontally.

However, when the piston rod 24 is directed downwardly, the hydraulic fluid, which has been wiped off the rod 24 by the wiping ring 48, accumulates adjacent the wiping ring, due to the action of gravity. Thus, until the space 72 becomes full of hydraulic fluid, there is no pool or body of fluid in contact with the sealing ring 46. Under these conditions, it has been found that the amount of hydraulic fluid carried outwardly by the piston rod 24 on the outward strokes thereof exceeds the amount of fluid carried inwardly on the inward strokes. Thus, the fluid tends to accumulate in the space 72 between the wiping and sealing rings 46 and 48, until the space becomes substantially full of fluid. On the next outward stroke of the piston rod 24, additional fluid is carried past the sealing ring, with the result that the fluid in the space 72 is compressed. It has been found that in some cases the hydraulic pressure in the space 72 builds up to an excessive value during the outward stroke of the piston rod 24. The pressure in the space 72 may become so high as to cause leakage of hydraulic fluid between the rod and the wiping ring 48, or at least to prevent the wiping ring from wiping all of the fluid off the rod. Under these conditions, the exposed portion of the rod 24 will be wet with hydraulic fluid, which is undesirable, as already noted.

The present invention provides means for preventing the development of any great or excessive pressure in the space 72 between the sealing and wiping rings 46 and 48. Generally, the present invention contemplates the provision of means whereby the space between the rings may be overfilled without generating any excessive pressure therein, and without losing any hydraulic fluid therefrom. In other words, means are provided, in the space 72, or connected therewith, whereby the volume of the space is effectively expansible without the development of great or excessive pressure in the space.

The means for preventing the development of any great pressure in the space 72 may take the form of cushion means in the space 72 or communicating therewith. The cushion means provide a resilient, readily compressible cushion so that the effective volume of the space 72 is elastically expansible to a considerable extent, without the development of any great pressure therein. The elastic expansibility of the space between the sealing and wiping rings 46 and 48 greatly reduces the rate of pressure rise as additional hydraulic fluid is carried into the space by the outward movement of the piston rod. The hydraulic pressure in the space 72 is thereby kept quite low, with the result that the wiping ring 48 is able to wipe substantially all of the fluid off the rod 24. When the rod travels inwardly, the excess fluid in the space 72 is carried inwardly by the rod, past the sealing ring 46. The cushion thus expands and tends to return to its normal, unstressed condition.

In the seal 20 of Fig. 1, the cushion is provided by arranging the wiping ring 48 for outward movement along the recess 68 and in the direction of the movement of the rod 24. Thus, the recess or counterbore 68 is cylindrical in shape and is arranged to extend outwardly to the end of the gland 28.

The outward movement of the wiping ring 48 is resisted by a resilient element which takes the form of a spring 74, in the seal 20 of Fig. 1. It will be seen that a backing washer or disk 76 is interposed between the spring 74 and the wiping ring 48. While the spring 74 might be of various types, it is shown as a coiled compression spring. The outer end of the spring 74 abuts against a suitable stop, such as the illustrated expansion ring 78, which is seated in an internal groove 80 formed in the counterbore 68.

Initially, the spring 74 is unstressed or lightly stressed, and the wiping ring 48 is against the stop fin 70, as shown in Fig. 1. The rate at which hydraulic pressure can build up in the space 72 is controlled by the cushion action of the spring-biased, movable wiping ring 48. Any pressure pushes the wiping ring 48 outwardly, against the elastic resistance of the spring 74. Thus, the relationship between the pressure in the space 72 and the volume thereof is determined by the strength of the spring 74. The spring 74 is made sufficiently flexible to prevent any undue pressure rise in the space 72 during any outward stroke of the piston rod 24. When the excess fluid in the space between the rings is returned to the casing 26 past the sealing ring 46, the wiping ring 48 is returned toward its original position by the spring 74. Thus, the spring-biased ring 48 acts as a follower. It will be evident that the cushioning action will be obtained with any suitable form of wiping ring.

It will be understood that the sealing ring 46 affords great resistance to outward leakage of hydraulic fluid, while affording relatively much less resistance to inward passage of the hydraulic fluid from the space 72 to the interior of the casing 26. In the case of the specific sealing ring 46, illustrated in Fig. 1, very little pressure is required in the space 72 to cause reverse flow of hydraulic fluid past the ring. Moreover, the inward movement of the piston rod is effective to carry a considerable amount of hydraulic fluid inwardly past the sealing ring 46. Thus, any excess fluid in the space 72 readily passes inwardly past the sealing ring 46 when the piston rod is stationary or moving inwardly. The cushion spring 74 can be made sufficiently flexible to keep the maximum pressure in the space 72 at a low value, such that the wiping ring 48 will not leak or even pass sufficient fluid outwardly to wet the piston rod to any substantial extent.

By way of variation, Figs. 4 and 5 illustrate a cushioning arrangement which is the same as that illustrated in Fig. 1, except that the coil spring 74 is replaced with a wave spring 82, comprising a flat, annular member bent or otherwise formed into wave-like shape. As in Fig. 1, the spring acts between the stop ring 78 and the backing washer 76.

Another modified cushion arrangement is shown in Fig. 6. Here again, the arrangement is similar to that of Fig. 1, except that the coil spring 74 is replaced by what might be termed a rubber spring 84, in the form of a relatively thick washer of soft resilient rubber or rubber-like material, preferably of a spongy character.

Fig. 7 illustrates another modified seal 86 having modified cushion means 88. The seal 86 also embodies a modified wiping ring 90, which, however, is of the specific type disclosed and claimed in the copending Maha application, Serial No. 438,381. Briefly, the wiping ring 90 is similar to rings 46 and 48 in that it has a generally rectangular base portion 92 with inner and outer lips 94 and 96 diverging therefrom and compressed between the rod 24 and the bottom wall of a groove 98 formed in the bore 30. The wiping ring 90 has an open annular groove 100 between the lips 94 and 96 so that any pressure in the space 72 between the rings 46 and 90 is applied between the lips 94 and 96. The inner lip 94 has a square or radial end face 102 which is adapted to shear hydraulic fluid off the rod 24. A similar square end face 104 is formed on the outer lip 96. As in the ring 46, the end faces 102 and 104 are tapered or frusto-conical when the ring 90 is in a free, unstressed state. At its outer end the ring 90 is provided with a third lip 106 adapted to wipe any foreign matter off the rod 24. The lip 106 extends outwardly through an annular slot or opening 108 between the rod 24 and the gland. In this case, the gland is designated 110 because of its somewhat modified character. Except as otherwise described, however, the gland 110 may be the same as the gland 28. The lip 106 is compressed outwardly between the rod 24 and the wall defining the opening 108. A square or radial outer end face 112 is formed on the lip 106 to shear any foreign matter off the rod.

As already indicated, the cushioning device 88 is of a different type than heretofore described, but the general effect of the device is to provide for elastic expansion of the volume of the space 72 between the rings 46 and 90. In this instance, the cushioning device 88 takes the form of a cylinder or accumulator 114 threaded into or otherwise mounted on the gland 110. A piston 116 is movable outwardly in the cylinder 114, against the resilient resistance of a coiled compression spring 118. It will be seen that the piston is fitted with a sealing ring 120 to prevent leakage of fluid past the piston. A passage 122 is provided in the gland 110 to establish communication between the space 72 and the inner end of the cylinder 114.

After the space 72 is full of hydraulic fluid, the addition of any hydraulic fluid by the outward movement of the rod 24 will move the cushioning piston 116 away from the inner end of the cylinder 114 and against the resilient biasing action of the spring 118. The spring controls the rate at which pressure builds up in the space between the sealing and wiping rings 46 and 90. Thus, the spring cushion 88 prevents undue hydraulic pressure between the rings. When the excess fluid in the space 72 returns to the casing past the seal 46, the piston 116 is returned toward its original position by the spring 118.

Figs 8 and 9 illustrate still another modified cushioning arrangement which is adapted to form one or more air cushions communicating with the space 72 between the sealing and wiping rings 46 and 90. Thus, means are provided in the gland to define one or more pockets from which it is virtually impossible for air to escape, whatever the position of the piston rod 24.

Fig. 8 illustrates a modified gland 126 having blind air passages from which the air cannot entirely escape, whatever the position of the rod 24. More specifically, the gland 126 has a plurality of longitudinally extending passages 128 which may be formed by drilling into the outer ends of the passages 128 so that both the outer and inner end passages will be closed off. Radial passages 132 are arranged to extend from the longitudinal passages 128 to the portion of the bore 32 between the rings 46 and 90.

When the piston rod 24 is directed downwardly, air pockets will be formed in the inner ends of the blind passages 128. If the rod 24 is directed upwardly, the outer ends of the blind passages 128 will form the air pockets. If the rod 24 is arranged horizontally, one or more of the air pasages 128 will be uppermost and will form one or more air pockets.

It will be understood that the blind air cushion passages may be arranged in various ways to trap pockets of air, whatever the position of the piston rod. Thus, the passages might assume the form of one or more grooves in the portion of the bore 32 between the rings 46 and 90.

Fig. 10 illustrates another modified sealing arrangement 140 mounted in a slightly modified gland 142. In this case, the elastic cushion for the space 72 is provided by a modified wiping ring 144, which is generally the same as the wiping ring 48 of Fig. 1, except that the modified wiping ring 144 is arranged to be resiliently compressible. In the illustrated construction, this is accomplished by forming the ring 144 with a hollowed-out base portion 146. More specifically, one or more recesses 148 are provided in the base portion 146. It will be observed that the recesses 148 reduce the cross section of the base portion 146 so that the base portion will be much more readily compressible than in the previously described wiping rings. The recesses 148 may assume various forms. Thus, in Fig. 11, the recesses 148 are illustrated as circular bore-like openings which are distributed angularly around the outer end face of the wiping ring 144.

Fig. 12 illustrates a modified recess 150 which may replace the recesses 148. In this case, the recess 150 takes the form of a continuous annular groove formed in the end face of the wiping ring.

Whether the recesses in the wiping ring 144 are of the form shown in Fig. 11, or of the modified form shown in Fig. 12, the ring is compressible quite readily by any hydraulic pressure that may build up in the space 72 between the sealing and wiping rings 46 and 144. The compression of the wiping ring 144 increases the volume of the space 72 so that additional hydraulic fluid can be accommodated without an excessively rapid rise in the hydraulic pressure in the space. Thus, the hydraulic pressure is kept low until the excess fluid can be returned past the sealing ring 46 to the interior of the casing 26.

Fig. 13 illustrates still another modified sealing arrangement 152 utilizing a gland 154 which is generally similar to the gland 110, except that the pressure accumulator 88 is omitted. It will be seen that the seal 152 embodies a compressible wiping ring 156 which is somewhat similar to the wiping ring 90 of Fig. 7. However, the wiping ring 156 has a base portion 158 which is resiliently compressible to a much greater extent than in the case of the ring 90. The base portion 158 has recess means 160 therein, similar to the recesses 148 and 150 of Figs. 10–12. Thus, the recess 160 may be a continuous annular groove in the outer end of the space portion 158, as in the case of the recess 150. Alternatively, the recess means 160 may constitute spaced openings, as in the case of the recesses 148.

In order that the wiping ring 156 may be even more readily compressible, the ring is provided with additional recess means in at least one of its curved lateral sides. In this instance, recesses 162 and 164 are formed in both lateral sides, the recess 162 being in the inner side and the recess 164 in the outer side. It will be seen that the recesses 162 and 164 are pronounced and deeply formed so as to give the ring 156 a considerably greater amount of compressibility than it otherwise would have. Thus, the recesses 162 and 164 are considerably more pronounced than the slight relieving or arching of the side walls that will be observed in the ring 90 of Fig. 7. The recesses 162 and 164 effectively reduce the cross section of the ring 156 to a substantial extent.

It will be apparent that the wiping ring 156 is adapted to yield elastically when hydraulic pressure builds up in the space 72 between the sealing and wiping rings 46 and 156. This resilient yielding action reduces the rate at which the pressure is built up so that the pressure will be kept low until the excess fluid can be returned past the sealing ring 46 and into the interior of the casing 26.

It has already been indicated that the cushioning action of the present invention may be achieved with various suitable types of wiping rings. Thus, the wiping ring may take the form of a conventional O-ring, for example. Various other conventional or commercially available types of seals may be employed for the wiping ring.

Thus, Fig. 14 illustrates a modified seal 170 which is essentially the same as the seal illustrated in Fig. 4, except that the wiping ring 48 is replaced with a conventional O-ring 172. It will be seen that the O-ring 172 is mounted in a recess or counterbore 174 formed in a modified gland 176. Except as otherwise described, however, the gland 176 may be the same as the gland 28 of Figs. 1 and 4. To provide a resilient cushioning action, the O-ring 172 is movable axially in an outward direction against the resilient resistance of the wave spring 82, which is the same as in Fig. 4. The backing washer 76 is again employed between the spring 82 and the O-ring 172. In all other respects, the seal 170 may be the same as in Figs. 1 and 4.

If any substantial pressure builds up in the space 72 between the sealing ring 46 and the O-ring 172, the O-ring will move outwardly against the resistance of the spring 82. Thus, the cushioning action of the spring will limit the maximum pressure in the space 72 during the outward movement of the piston rod 24. When the rod is stationary or moving inwardly, the excess fluid in the space 72 will be returned past the sealing ring and into the casing. At the same time, the spring 82 will return the O-ring toward its original position.

Fig. 15 illustrates another modified seal 180 which is the same as the seal shown in Fig. 7, except that the wiping ring 90 is replaced with a modified wiping ring 182, which takes the form of a conventional O-ring seated in a groove 184 in a modified gland 186. However, except for the arrangement of the groove 184, the gland 186 may be the same as the gland 110 of Fig. 7. The construction of Fig. 15 illustrates the point that a wide variety of wiping rings may be employed in practicing the present invention. It will be recognized that a conventional O-ring type of wiping ring might be employed in the type of cushioned seal illustrated in Fig. 8. Various other conventional or suitable wiping rings may be employed in connection with the present invention.

As already indicated, it is possible to employ a wide variety of sealing rings with the present invention. For example, Fig. 16 illustrates a modified seal 190 which utilizes conventional V-section sealing rings 192 made of a suitable soft flexible material such as leather or rubber-like material. The sealing arrangement 190 employs a slightly modified casing 194 having a bore 196 therein for guiding the piston rod 24. The lower end of the bore 196 opens into a counterbore 198 which is adapted to receive the V-section rings 192. Four such rings are illustrated, but any desired or suitable number may be employed. The rings are arranged with their inner edges engaging the periphery of the piston rod 24. The outer edges of the rings 192 engage the counterbore 198. It will be seen that the rings 192 are of the usual V-shaped cross section and thus are formed with inner and outer lips 200 and 202. The rings 192 are oriented so that their lips 200 and 202 angle toward the interior of the casing 194. In the usual manner, the V-section rings 192 are pressed between backing rings 204 and 206 which are disposed around the shaft 24 and are received in the counterbore 198. The inner ring 204 has a V-shaped projection 208, adapted to be received between the lips 200 and 202 of the innermost sealing ring 192. On the other hand, the outer backing ring 206 has a V-shaped depression 210 which receives the outermost sealing ring 192. It will be seen that the seal 190 employs a slightly modified gland 212 having a reduced inner end portion 214 which is adapted to be received in the counterbore 198. The gland 212 has a threaded portion 216 which is received in an internally threaded outer counterbore 218 in the casing 194. Thus, the gland may be screwed inwardly so that the reduced inner portion 214 will press the outer backing ring 206 against the outermost sealing ring 192. In this way, the sealing rings 192 are compressed between the backing rings 204 and 206. The gland 212 may be locked by any suitable means, such as the illustrated lock nut 220.

In some respects, the sealing action of the V-section rings 192 is similar to that of the double-lipped ring 46. Thus, the V-section rings 192 prevent any substantial leakage of hydraulic fluid in an outward direction from the interior of the casing 194. However, the V-section rings 192 afford relatively small resistance to inward return of hydraulic fluid from the space 72 between the sealing rings and the wiping ring. Thus, the rings 192 provide a certain measure of one-way check valve action. They are effective to vent the space 72 to the interior of the casing 194 before any great or excessive pressure can develop in the space 72. Moreover, the piston rod 24 is effective to carry hydraulic fluid inwardly from the space 72, past the V-section rings 192. It will be understood that the V-section sealing rings may be replaced with various other suitable sealing rings. Ecept as otherwise described, the seal 190 of Fig. 16 may be the same as the seal of Fig. 1. It will be understood that the V-section sealing rings may be employed with any of the other seals of the present invention.

Fig. 17 illustrates another modified seal 230 which is somewhat similar to the seal of Fig. 7. However, the sealing ring 46 of Fig. 7 is replaced with a modified sealing ring 232, which takes the form of a conventional O-ring made of fairly soft rubber-like material. The modified sealing arrangement 230 employs a modified gland 234 having a groove 236 therein for receiving the O-ring 232.

As illustrated, the wiping ring 90 may remain the same in Fig. 17 as in Fig. 7, or any other suitable type of wiping ring may be employed. However, the sealing arrangement 230 of Fig. 17 employs modified means for preventing the development of great or excessive pressure in the space 72 between the sealing and wiping rings 232 and 90. Thus, the spring-biased accumulator 88 of Fig. 7 is replaced by a stand pipe 238 in Fig. 17. It will be seen that the lower end of the stand pipe 238 is threaded into or otherwise connected to an opening 240 in the gland 234. A passage 242 extends in the gland 234 between the opening 240 and the space 72. As illustrated, the stand pipe 238 may have a portion 244 extending laterally a convenient distance, and a portion 246 extending upwardly from the outer end of the portion 244. The stand pipe may extend several inches or some other suitable distance above the level of the sealing ring 232 and may communicate at its upper end with the atmosphere through an opening 248.

As in the other embodiments, the O-ring seal 232 prevents any substantial outward leakage of hydraulic fluid. However, a film of hydraulic fluid adheres to the piston rod 24 and is carried outwardly past the sealing ring 232 on the outward stroke of the rod 24. This film of hydraulic fluid is wiped off the rod 24 by the wiping ring 90. When the piston rod 24 is directed downwardly, the fluid wiped off the rod accumulates in the space 72 between the sealing and wiping rings 232 and 90. As the space 72 fills with fluid, the fluid rises in the stand pipe 238. After the space 72 is filled with fluid, however, the rod 24 returns as much fluid on its inward stroke as it carries outwardly past the sealing ring 232 on its outward stroke. Thus, the level of the fluid in the stand pipe 238 never rises more than a small amount above the sealing ring 232. On the outward strokes of the rod 24, the fluid rises slightly in the stand pipe 238. This action prevents the development of any great pressure in the space 72 between the rings 232 and 90. On the inward strokes of the rod 24, the fluid drops slightly in the stand pipe 238 as the excess fluid is returned past the sealing ring 232 by the rod. Thus, the stand pipe 238 relieves the pressure in the space 72 between the rings, without permitting the loss of any hydraulic fluid.

It will be appreciated that the O-type sealing ring 232 differs from the other illustrated sealing rings in that it does not have a differential action with respect to fluid pressure on its opposite sides. Thus, the O-ring 232 seals equally well in either direction. However, the piston rod 24 is effective to carry at least as much fluid inwardly past the O-ring as it carries outwardly, with only a slight rise of fluid in the stand pipe 238. Thus, the return of fluid past the sealing ring is due, for the most part, to the movement of the piston rod, rather than to the development of any pressure in the space between the sealing and wiping rings.

It will be understood that the stand pipe of Fig. 17 may be employed to provide a yieldable cushion for the space between the sealing and wiping rings in any of the various illustrated embodiments of the invention. Likewise, the O-type sealing ring may be employed in any of the embodiments. For that matter, any of the illustrated yieldable cushion arrangements may be employed with any of the sealing and wiping rings.

With any of the seals of the present invention, all leakage of hydraulic fluid from the cylinder or other device is prevented. Moreover, the exposed portion of the piston rod is wiped practically dry. This is true whatever the position of the cylinder may be, even when the piston rod is directed downwardly. The thin film of hydraulic fluid, which is carried past the sealing ring by the piston rod, is wiped off th erod by the wiping ring. On its inward strokes, the rod returns any excess fluid in the space between the sealing and wiping rings. The cushioning or pressure relieving arrangement of the present invention is such that the volume of fluid between the sealing and wiping rings may increase on the outward strokes of the rod without any great or excessive increase in the pressure between the rings. Thus, the present invention provides readily yieldable pressure relieving means which are mounted in or connected to the space between the rings. By virtue of these means, the wiping ring is able to wipe the rod practically dry. Moreover, there is no tendency for the wiping ring to be blown out of its normal position. In addition, the various components of the seal will give extremely long, dependable service.

Various modifications, alternative constructions and equivalents may be employed without departing from the true spirit and scope of the invention as exemplified in the foregoing description and defined in the following claims:

I claim:

1. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means forming an enclosed space between said sealing and wiping rings, said seal-supporting member having a first annular retaining wall to the rear of said sealing ring for retaining said sealing ring against rearward axial movement under the action of fluid pressure, said seal-supporting member having a second annular retaining wall to the rear of said wiping ring, said wiping ring having a hollowed out compressible rear portion of reduced cross section so that any pressure that may build up in said enclosed space due to wipeage of fluid from the inner member will compress said wiping ring against said second annular retaining wall so as to enlarge said space, said wiping ring being of resilient rubberlike material and thus being fully self-restoring when the pressure on said wiping ring is relieved.

2. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means forming an enclosed space between said sealing and wiping rings, said seal-supporting member having a first annular retaining wall to the rear of said sealing ring for retaining said sealing ring against rearward axial movement under the action of fluid pressure, said seal-supporting member having a second annular retaining wall to the rear of said wiping ring, said wiping ring having a rear portion with a plurality of hollows therein facing said second retaining wall, said hollows reducing the cross section of said rear portion and rendering said rear portion compressible so that any pressure that may build up in said enclosed space due to wipeage of fluid from the inner member will compress said wiping ring against said second annular retaining wall so as to enlarge said space, said wiping ring being of resilient rubberlike material and thus being fully self-restoring when the pressure on said wiping ring is relieved.

3. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means forming an enclosed space between said sealing and wiping rings, said seal-supporting member having a first annular retaining wall to the rear of said sealing ring for retaining said sealing ring against rearward axial movement under the action of fluid pressure, said seal-supporting member having a second annular retaining wall to the rear of said wiping ring, said wiping ring having a rear portion with an annular hollow therein reducing the cross section thereof and rendering said rear portion compressible so that any pressure that may build up in said enclosed space due to wipeage of fluid from the inner member will compress said wiping ring against said second annular retaining wall so as to enlarge said space, said wiping ring being of resilient rubberlike material and thus being fully self-restoring when the pressure on said wiping ring is relieved.

4. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means forming an enclosed space between said sealing and wiping rings, said seal-supporting member having a first annular retaining wall to the rear of said sealing ring for retaining said sealing ring against rearward axial movement under the action of fluid pressure, said seal-supporting member having a second annular retaining wall to the rear of said wiping ring, said wiping ring having a rear portion with an annular hollow therein opening rearwardly toward said second retaining wall, said hollow reducing the cross section of said rear portion and rendering it compressible so that any pressure that may build up in said enclosed space due to wipeage of fluid from the inner member will compress said wiping ring against said second annular retaining wall so as to enlarge said space, said wiping ring being of resilient rubberlike material and thus being fully self-restoring when the pressure on said wiping ring is relieved.

5. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means forming an enclosed space between said sealing and wiping rings, said seal-supporting member having a first annular groove formed into said bore for receiving and retaining said sealing ring, said seal-supporting member having a second annular retaining groove formed in said bore to the rear of said first groove for receiving said wiping ring, said wiping ring having a hollowed out compressible rear portion of reduced cross section relative to the corresponding rear portion of said second groove so that any pressure that may build up in said enclosed space due to wipeage of fluid from the inner member will compress said wiping ring into the rear portion of said second groove so as to enlarge said space, said wiping ring being of resilient rubberlike material and thus being fully self-restoring when the pressure on said wiping ring is relieved.

6. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means forming an enclosed space between said sealing and wiping rings, said seal-supporting member having a first annular groove formed into said bore for receiving and retaining said sealing ring, said seal-supporting member having a second annular retaining groove formed in said bore to the rear of said first groove for receiving said wiping ring, said wiping ring having a rear portion with recess means therein providing substantial hollow space between said rear portion and the corresponding rear portion of said second groove, said hollow space rendering said rear portion substantially compressible so that any pressure that may build up in said enclosed space due to wipeage of fluid from the inner member will compress said wiping ring into the rear portion of said second groove so as to enlarge said space, said wiping ring being of resilient rubberlike material and thus being fully self-restoring when the pressure on said wiping ring is relieved.

7. Combination sealing and wiping apparatus for use between inner and outer telescopically disposed elements adapted for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, and a wiping ring spaced along said bore from said sealing ring for wiping fluid off the inner element, said seal-supporting member having means defining a space between said sealing and wiping rings, said wiping ring being provided with fully self-restoring, fully resilient spring means supporting at least a portion of said wiping ring for substantial axial movement away from said sealing ring to reduce build-up of pressure in said space as said space fills with fluid carried past said sealing ring by said inner element on the outward stroke thereof and wiped off said inner element by said wiping ring.

8. The combination defined in claim 7, in which said spring means comprises a rubber-like resilient spring member.

9. The combination of claim 7, in which said spring means comprises a resilient metal spring member.

10. The combination of claim 7, in which said spring means comprises a hollowed out resilient compressible rubber-like rear portion of said wiping ring, said rear portion being of reduced cross-section so that any pressure that may build up in said space between said rings due to wipeage of fluid from the inner member will displace said wiping ring rearwardly while said compressible rear portion is compressed so as to enlarge said space.

11. Combination sealing and wiping apparatus for use between inner and outer telescopically disposed elements arranged for relative actuation by fluid pressure, said apparatus comprising, in combination, an annular seal-supporting member adapted to be secured to one end of the outer element and having a bore for receiving the inner element, a sealing ring disposed along said bore for preventing any substantial leakage of fluid around the inner element, a wiping ring spaced along said bore behind said sealing ring for wiping fluid off the inner element, said seal-supporting member having means defining a space having an initial portion between said sealing and wiping rings, said space having an additional portion for receiving fluid beyond the normal capacity of said initial portion to reduce build-up of pressure therein due to fluid carried past said sealing ring into said space by said inner element on the outward stroke thereof and wiped off said inner element by said wiping ring, and fully self-restoring displaceable pressure relieving means affording progressively increasing resilient resistance to entry of fluid into said additional portion and providing resilient self-restoring force for returning fluid to said initial portion to prevent escape of fluid from said space.

12. The combination of claim 11, in which said fully self-restoring pressure relieving means comprises means supporting at least a portion of said wiping ring for substantial axial movement away from said sealing ring while resiliently resisting such movement.

13. The combination of claim 11, in which said fully sel-restoring pressure relieving means comprises a resiliently compressible rear portion of said wiping ring supporting said wiping ring for substantial compressive axial movement away from said sealing ring while resiliently resisting such movement.

14. The combination of claim 11, in which said fully self-restoring pressure relieving means comprises means mounting said wiping ring for substantial movement along said bore away from said sealing ring, and a fully resilient spring member acting on the rear of said wiping ring and resiliently resisting such movement thereof.

15. The combination of claim 14, in which said resilient spring member comprises a fully resilient metal spring.

16. The combination of claim 14, in which said resilient spring member comprises a fully resilient compressible rubber-like member.

17. The combination of claim 11, in which said fully self-restoring pressure relieving means comprises means defining an accumulator chamber for receiving excess fluid from said space, a displaceable accumulator member in said chamber, and fully resilient means biasing said accumulator member for resiliently resisting displacement thereof.

18. The combination of claim 11 in which said fully self-restoring pressure relieving means comprises upwardly extending blind passage means communicating with said space for trapping air to provide an air cushion resiliently resisting entry of excess fluid into said passage means.

19. The combination of claim 11 in which said pressure relieving means comprises a standpipe connected to said space and extending upwardly therefrom for receiving excess fluid therefrom and returning fluid thereto by the fulyy restoring action of gravity.

References Cited in the file of this patent

UNITED STATES PATENTS

| | | |
|---|---|---|
| 2,305,954 | Focht | Mar. 31, 1936 |
| 2,348,004 | Gruetjen | May 2, 1944 |
| 2,443,332 | Summers | June 15, 1948 |
| 2,509,436 | Isenbarger | May 30, 1950 |
| 2,565,923 | Hrdlicka | Aug. 28, 1951 |
| 2,639,198 | Kirkham | May 19, 1953 |
| 2,701,155 | Estel | Feb. 1, 1955 |
| 2,815,970 | Wallace | Dec. 10, 1957 |

FOREIGN PATENTS

| | | |
|---|---|---|
| 639,216 | Great Britain | June 21, 1950 |